(12) United States Patent
Park et al.

(10) Patent No.: US 7,545,574 B2
(45) Date of Patent: Jun. 9, 2009

(54) LIQUID LENS HAVING IMPROVED SEALING STRUCTURE

(75) Inventors: Young Kyu Park, Gyunggi-Do (KR); Sun Ok Kim, Seoul (KR); Byung Do Oh, Gyunggi-Do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 283 days.

(21) Appl. No.: 11/713,609

(22) Filed: Mar. 5, 2007

(65) Prior Publication Data

US 2007/0247723 A1  Oct. 25, 2007

(30) Foreign Application Priority Data

Apr. 24, 2006  (KR) ............. 10-2006-0036901

(51) Int. Cl.
  *G02B 1/06*  (2006.01)
(52) U.S. Cl. .................................... 359/665; 359/666
(58) Field of Classification Search ............. 359/665, 359/666
  See application file for complete search history.

(56) References Cited

U.S. PATENT DOCUMENTS

2004/0227838 A1  11/2004  Atarashi et al.

2009/0021842 A1 *  1/2009  Berge et al. ............... 359/666

FOREIGN PATENT DOCUMENTS

| FR | 2 887 637 | 12/2006 |
|---|---|---|
| JP | 2002-162506 | 6/2002 |
| WO | 2005/109074 | 11/2005 |
| WO | 2006/136613 | 12/2006 |
| WO | 2007/058451 | 5/2007 |

OTHER PUBLICATIONS

KIPO Notice of Office Action issued in corresponding Korean Patent Application No. 10-2006-0036901 mailed on Apr. 20, 2007.
Extended European Search Report issued in corresponding European Patent Application No. 07250914.4, on Jul. 23, 2007.

* cited by examiner

*Primary Examiner*—William C Choi

(57) ABSTRACT

A liquid lens for adjusting a focal length by electro-wetting. A body houses a non-conductive fluid and a conductive fluid therein. A cover is capped on the body. A first adhesive bonds the body to the cover, the first adhesive curing rapidly. Also, a second adhesive bonds an outer periphery of the body to an outer periphery of the cover. The glass cover and the body are bonded across a large area by two types of adhesives with different compositions. This allows the lens manufactured to greatly withstand temperature and heat impact and stay durable in a high-temperature humid environment, thereby significantly elevating a quality of the final product.

5 Claims, 5 Drawing Sheets

LIQUID LENS HAVING IMPROVED SEALING STRUCTURE

CLAIM OF PRIORITY

This application claims the benefit of Korean Patent Application No. 2006-36901 filed on Apr. 24, 2006 in the Korean Intellectual Property Office, the disclosure of which is incorporated herein by reference.

BACKGROUND OF THE INVENTION

1. Field of the Invention

The present invention relates to a liquid lens for adjusting a focal length by electro-wetting, and more particularly, to a liquid lens with an improved sealing structure, in which a glass cover and a body are bonded together by two types of adhesives with different compositions, thereby significantly enhancing reliability of the final lens product.

2. Description of the Related Art

In general, a liquid lens is known to adjust a focal length by electro-wetting.

As shown in FIG. 1, the conventional liquid lens 200 includes an electrolyte 220 disposed on an insulator 210 and an electrode 230 disposed underneath the insulator 210. When current is supplied to the electrode 230 and the electrolyte 220, an interface angle θ between the electrolyte 220 and the insulator 210 is altered.

That is, a drop of electrolyte, if present on a surface of the insulator 210, forms interfaces between the insulator 210 and the electrolyte 220, the electrolyte 220 and gas 225, and the insulator 210 and the gas 225. Out of these, the electrolyte 220 and the insulator 210 have an interface angle θ therebetween according to following Young's equation.

$$\gamma_{SL} - \gamma_{SG} = \gamma_{LG} \cos\theta \qquad \text{Young's equation}$$

where S denotes the insulator, L denotes the electrolyte, G denotes the gas and γ denotes surface tension coefficient.

Here, the electrolyte 220 is made of a conductive fluid and the insulator 210 in contact therewith is made of an insulating film. Then the surface tension coefficient is altered when a voltage is applied to an electrode 212 formed below the insulator 210 and to an electrode 222 formed in the electrolyte 220. The surface tension coefficient is determined according to following Lippmann's equation.

$$\gamma = \gamma_0 - (1/2)cV^2 \qquad \text{Lippmann's equation}$$

As described above, the surface tension coefficient is changed according to the voltage V applied and a dielectric constant c of the insulating film. Then, the interface angle θ is altered by the change in the surface tension coefficient $\gamma_{SL}$ between the insulator 210 and the electrolyte 220.

FIGS. 2 and 3 illustrate a conventional liquid lens 300 adopting such a basic principle.

In the liquid lens 300, a body 305 is made of a conductive material and has an inner space 305a in a central portion thereof. A transparent substrate 310a is disposed underneath the body 305. The inner space 305a is filled with a non-conductive fluid 330 of oil and a conductive fluid 350 of electrolyte, which both are substantially identical in density. A transparent cover 310b is bonded onto the body 305. Also, a light transmissible electrode 33 is disposed underneath the cover 310b.

Furthermore, insulating layers 360 are formed on both inner walls of the inner space 305a to extend along an upper surface of the body 305. Another electrode 352 is formed on the body 305 to connect to a power voltage and a voltage is applied to the conductive fluid 350 through the electrode 332.

As a result, in the conventional liquid lens 300, a voltage is adjustably applied to the conductive fluid 350 through the electrodes 332 and 352. This alters an interface angle θ between insulating layers 360 and the conductive fluid 350, as shown in FIG. 3, thereby changing a shape of the interface between the conductive fluid 350 of electrolyte and the non-conductive fluid 330 of oil. This accordingly alters a focal length of light propagating through the interface.

Vigorous attempts have been made to commercialize the conventional liquid lens 300, whose final product, however, was hardly reliable.

In the conventional liquid lens 300, the body 305 made of a conductive material is filled with the non-conductive fluid 330 of oil and the conductive fluid 350 of electrolyte. Then the cover 310b is capped on the body 305 by using a bonding device (not illustrated). The bonding device applies an ultraviolet ray curing adhesive 370 along an outer periphery of the cover 310 so that the adhesive 370 is penetrated by a capillary phenomenon and cured to bond the cover 310b to the body 305.

While the ultraviolet ray curing adhesive 370 is penetrated between the cover 310b and the body by the capillary phenomenon and cured, the adhesive penetrating in an excessive amount is trapped inside adhesive blocking grooves 372 formed in the upper surface of the body and adjacent to the inner space 305a. The grooves 372 block the adhesive 370 from reaching the non-conductive fluid 330 and the conductive fluid 350 inside the inner space 305a, which are thus free from any effects of the adhesive 370.

The conventional liquid lens 300 lacks reliability. That is, a bonding portion between the cover 310b and the body 305 is limited to a small area, i.e., the outer periphery of the upper surface of the body 305. This structural vulnerability degrades durability. Moreover, heat generated from curing of the ultraviolet ray curing adhesive 370 expands the non-conductive and conductive fluids 330 and 350, weakening the bonding portion between the cover 310b and the body 305.

SUMMARY OF THE INVENTION

The present invention has been made to solve the foregoing problems of the prior art and therefore an aspect of the present invention is to provide a liquid lens with an improved sealing structure, in which a glass cover and a body are bonded together by two types of adhesives with different compositions to greatly withstand temperature and heat impact and stay durable even in a high-temperature humid environment, thereby significantly enhancing reliability of the final product.

Another aspect of the invention is to provide a liquid lens with an improved sealing structure in which an internal fluid is minimally expanded to bond an upper cover to the body stably, thereby minimizing product defects in a manufacturing process.

According to an aspect of the invention, the liquid lens for adjusting a focal length by electro-wetting, includes a body housing a non-conductive fluid and a conductive fluid therein; a cover capped on the body; a first adhesive bonding the body to the cover, the first adhesive curing rapidly; and a second adhesive bonding an outer periphery of the body to an outer periphery of the cover.

Preferably, the body has a step formed on an upper surface thereof along the outer periphery of the cover.

Preferably, the step has a vertical edge confirming to the outer periphery of the cover.

Preferably, the first adhesive comprises an ultraviolet ray curing adhesive mainly composed of modified acrylate.

Preferably, the second adhesive comprises an ultraviolet ray curing adhesive added with acryl.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
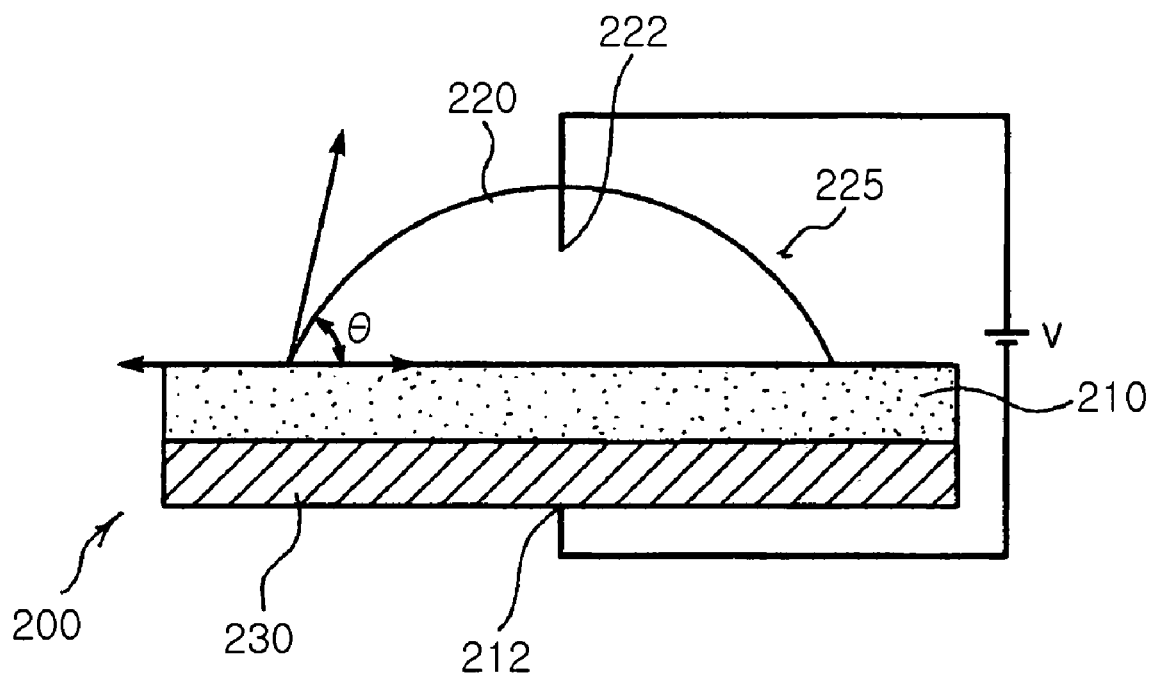
FIG. 1 is a cross-sectional view illustrating a conventional liquid lens using electro-wetting.
Figure 2:
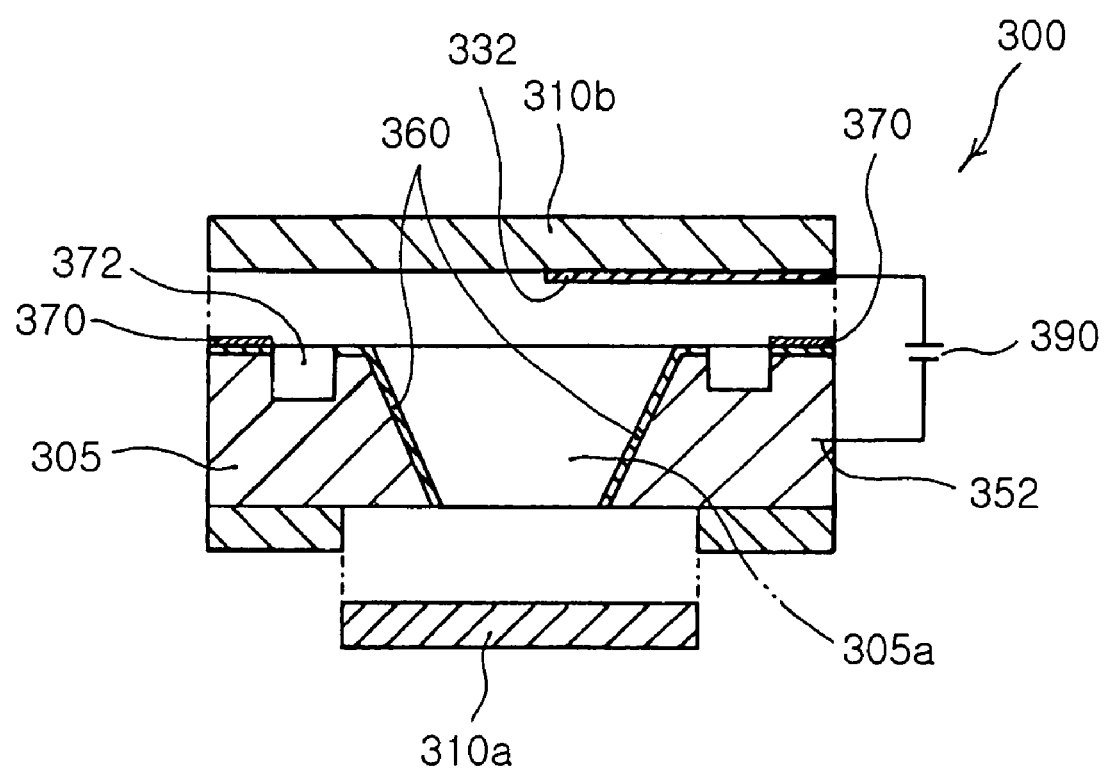
FIG. 2 is an exploded perspective view illustrating a conventional liquid lens with only a first bonding part.
Figure 3:
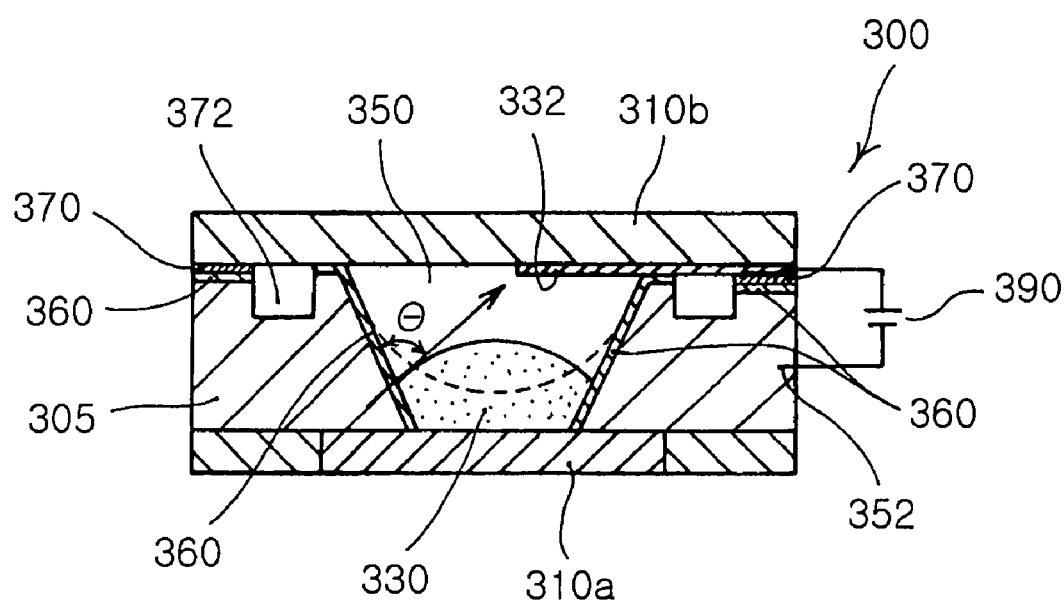
FIG. 3 is a cross-sectional view illustrating a conventional liquid lens with only a first bonding part.
Figure 4:
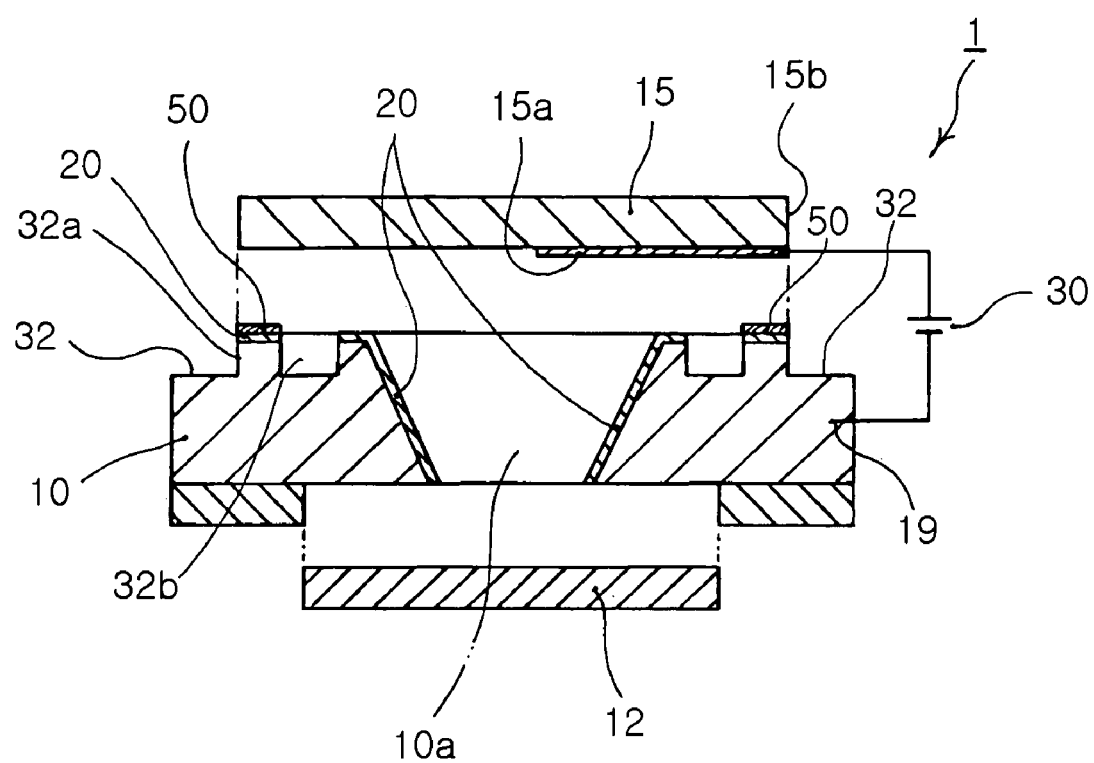
FIG. 4 is an exploded perspective view illustrating a liquid lens with an improved sealing structure according to the invention.
Figure 5:
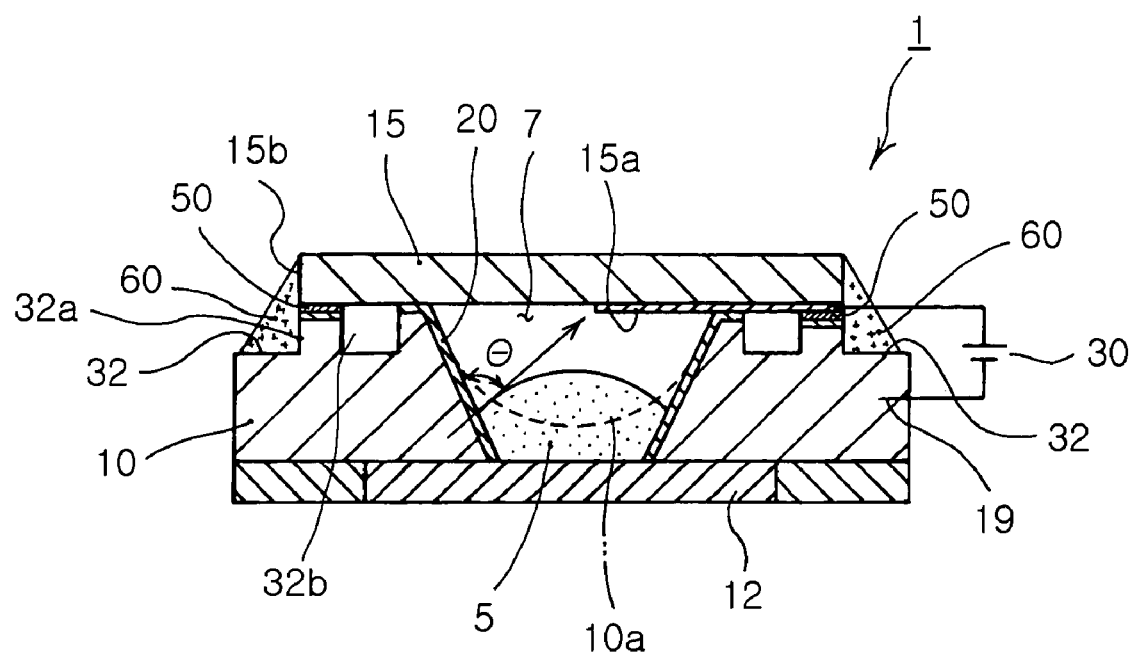
FIG. 5 is a cross-sectional view illustrating a liquid lens with an improved sealing structure according to the invention.

As shown in FIGS. 4 and 5, the liquid lens 1 with an improved sealing structure includes a body housing a non-conductive fluid 5 and a conductive fluid 7 therein. The body 10 has an inner space 10a formed in a central portion thereof, and is made of a conductive material, preferably stainless material such as steel use stainless (SUS). A transparent substrate 12, i.e., made of a glass material is disposed underneath the body 10.

The inner space 10a is filled with a non-conductive fluid 5 of oil and a conductive fluid 7 of electrolyte, which both are substantially identical in density. Also, a transparent cover 15, preferably made of a transparent glass, is capped on the body 10. A light transmissible electrode 15a is disposed underneath the cover 15.

Also, insulating layers 20 are formed on both inner walls of the inner space 10a of the body 10, extending along an upper surface of the body 10. An electrode 19 is formed in the body 10 to connect to a power voltage 30. Moreover, the body 10 has a step 32 formed on the upper surface thereof along an outer periphery 15b of the cover 15.

The step 32 has a cross-sectional shape of "L", and has a vertical edge 32a confirming to the outer periphery 15b of the cover 15.

The vertical edge 32a of the step 32 identical to the outer periphery 15b of the cover 15 allows stable bonding of a first adhesive 50 and a second adhesive 60, which will be explained later.

Also, the body 10 has an adhesive blocking groove 32a formed in the outer periphery 15b at one end thereof, adjacent to the inner space 10a. This prevents the adhesives for bonding the cover 15 and the body 10 together from reaching the non-conductive fluid 5 and the conductive fluid 7 inside the inner space 10a.

In the liquid lens of the invention, the non-conductive fluid 5 of oil and the conductive fluid 7 of electrolyte are filled in the inner space 10a of the body. Then, the cover 15 is capped on the body 10 via a bonding device (not illustrated) To this end, the first adhesive 50 is applied on a bonding portion between the body 10 and the cover 15 by a dispenser and the cover 15 is capped thereon to be bonded and cured.

The first adhesive 50 is preferably made of an ultraviolet ray curing adhesive mainly composed of modified acrylate. The first adhesive 50 is applied between the upper cover 15 and the body 10 and cured fast by ultraviolet ray irradiation, thereby bonding the cover 15 to the body 10 stably.

As just described, the first adhesive 50 is made of an ultraviolet ray curing adhesive mainly composed of modified acrylate. This allows the first adhesive 50 be cured rapidly, thereby preventing the non-conductive fluid 5 and the conductive fluid 7 inside the body 10 from thermally expanding. That is, the first adhesive 50 is rapidly cured before the fluids inside the body thermally expand thereby to primarily bond the cover 15 to the body 10.

After bonding is made through the first adhesive 50, as described in FIG. 5, the outer periphery 15b of the upper cover 15 is secondarily bonded by virtue of the step 32 of the body.

The second adhesive 60 is applied along the outer periphery 15b of the cover 155 on the step 32. The second adhesive 60 is made of an ultraviolet ray curing adhesive added with acryl and cured by ultraviolet ray irradiation, thus assuring high reliability.

In the liquid lens 1 with an improved sealing structure of the invention as described, a voltage, when applied to the conductive fluid 7 through the electrodes 15a and 19, alters an interface angle $\theta$ between the insulating layer 20 and the conductive fluid 7. This consequently alters a shape of the interface between the conductive fluid 7 of electrolyte and the non-conductive fluid 5 of oil, thereby changing a focal length of light propagating therethrough.

In the liquid lens 1 with the improved sealing structure of the invention, the first adhesive 50 is made of an ultraviolet ray curing adhesive mainly composed of modified acrylate. The first adhesive 50 is cured very rapidly, thereby preventing the non-conductive fluid 5 and the conductive fluid 7 inside the body 10 from thermally expanding. This allows the cover 15 to be bonded to the body 10 stably.

Furthermore, the second adhesive 60 is applied across a large area, i.e., along the outer periphery 15b of the cover 14 and on the step 32 of the body 10. This enables the cover 15 to be bonded solidly to the body 10.

In this liquid lens 1 with the improved sealing structure of the invention as described above, the cover 15 and the body 10 are attached to each other stably, thereby producing the liquid lens with a lower height.

Moreover, the liquid lens of the invention, when manufactured, is strong against heat impact and perfectly sealed even in a high-temperature humid environment, thus staying durable and improved in reliability of the product significantly.

As set forth above, according to exemplary embodiments of the invention, a glass cover and a body are bonded together across a large area by two types of adhesives with different compositions. Therefore, the lens, after manufactured, is strong against temperature and heat impact, durable even in a high-temperature humid environment, thereby enhancing reliability of the final product noticeably.

In addition, the adhesives for bonding an upper cover and the body together are cured rapidly so that non-conductive and conductive fluids inside the body are minimally expanded. This allows the cover to be bonded solidly to the body, thereby minimizing product defects that may occur during a manufacturing process.

While the present invention has been shown and described in connection with the preferred embodiments, it will be apparent to those skilled in the art that modifications and variations can be made without departing from the spirit and scope of the invention as defined by the appended claims.

What is claimed is:

1. A liquid lens for adjusting a focal length by electro-wetting, comprising:
   a body housing a non-conductive fluid and a conductive fluid therein;
   a cover capped on the body;
   a first adhesive bonding the body to the cover, the first adhesive curing rapidly; and
   a second adhesive bonding an outer periphery of the body to an outer periphery of the cover.

2. The liquid lens according to claim 1, wherein the body has a step formed on an upper surface thereof along the outer periphery of the cover.

3. The liquid lens according to claim 2, wherein the step has a vertical edge confirming to the outer periphery of the cover.

4. The liquid lens according to claim 1, wherein the first adhesive comprises an ultraviolet ray curing adhesive mainly composed of modified acrylate.

5. The liquid lens according to claim 1, wherein the second adhesive comprises an ultraviolet ray curing adhesive added with acryl.

* * * * *